Oct. 3, 1967 W. H. HARRIS 3,344,525
PRECISION DENTAL PARALLELING PROCESS AND APPARATUS
Filed Jan. 14, 1966 2 Sheets-Sheet 1
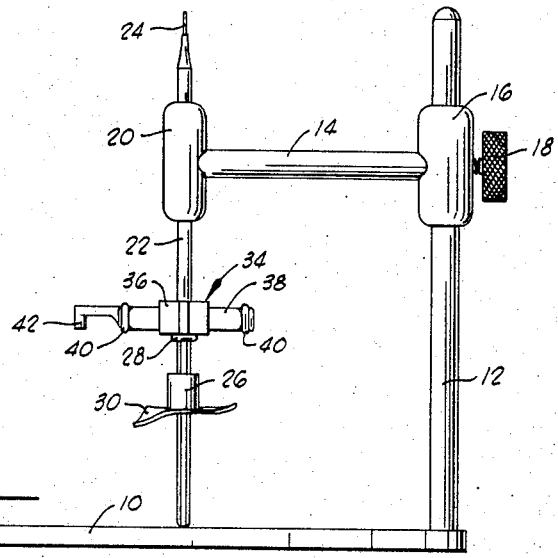
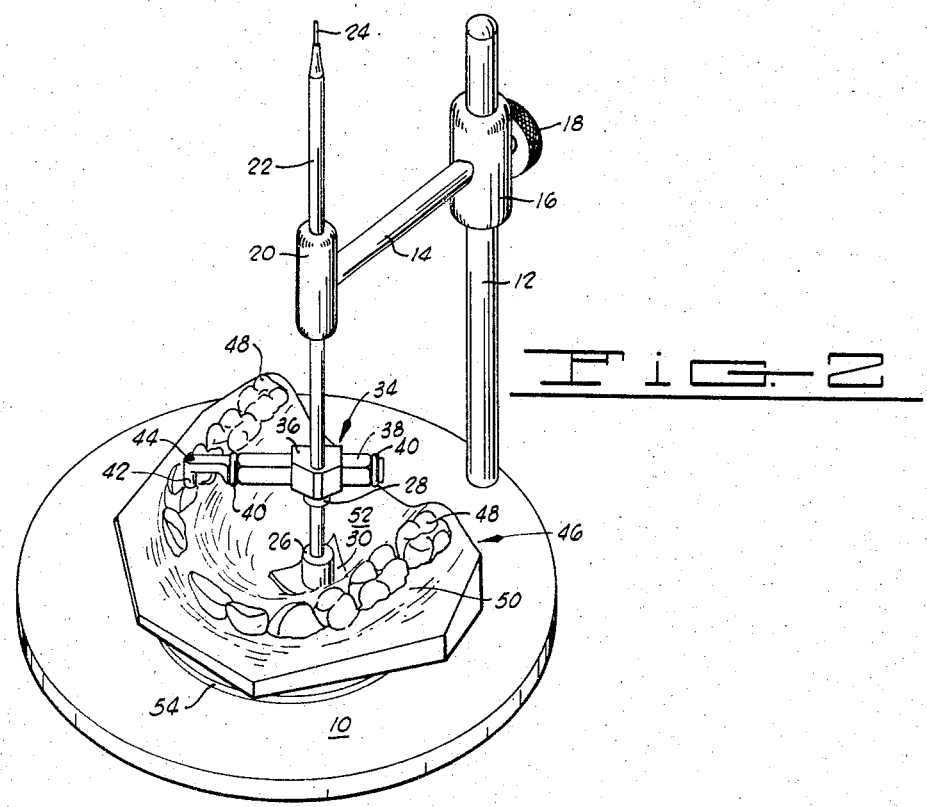
INVENTOR.
WILLIAM H. HARRIS
BY
Dunlap and Laney
ATTORNEYS Oct. 3, 1967 W. H. HARRIS 3,344,525
PRECISION DENTAL PARALLELING PROCESS AND APPARATUS
Filed Jan. 14, 1966 2 Sheets-Sheet 2
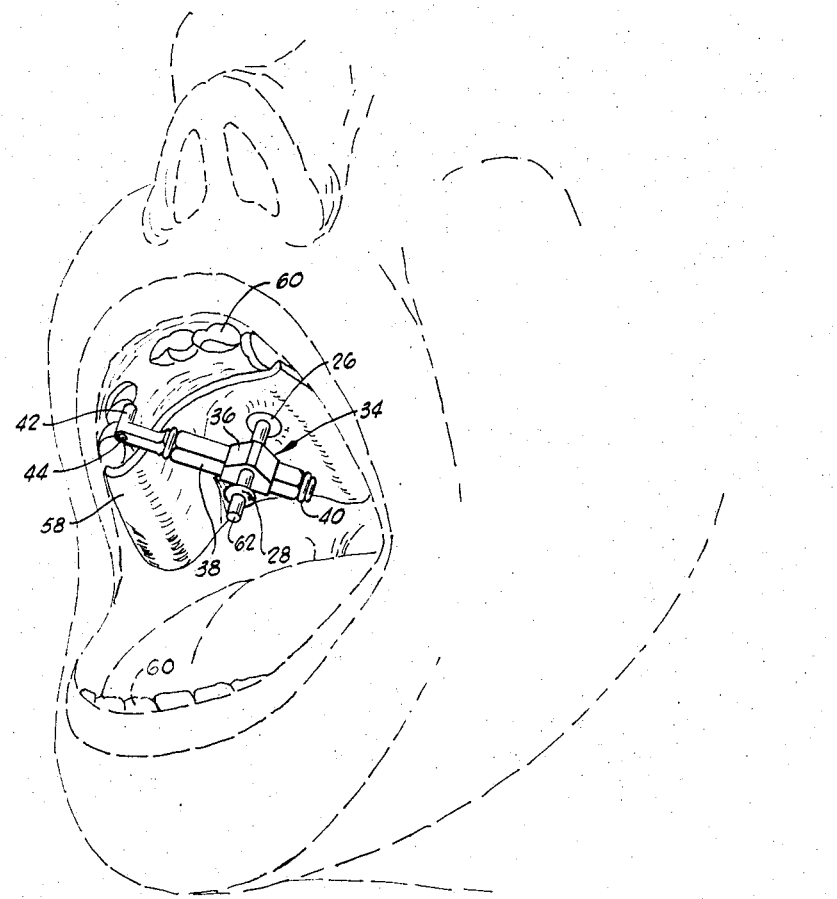
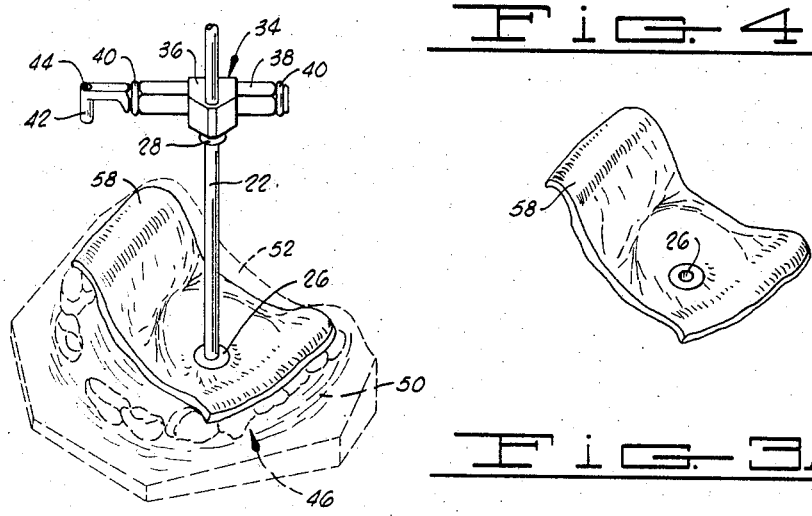
FIG. 4
FIG. 3A
FIG. 3
INVENTOR.
WILLIAM H. HARRIS
BY
Dunlap and Laney
ATTORNEYS 3,344,525
PRECISION DENTAL PARALLELING PROCESS
AND APPARATUS
William H. Harris, 4513 S. Pennsylvania,
Oklahoma City, Okla. 73119
Filed Jan. 14, 1966, Ser. No. 520,782
6 Claims. (Cl. 32—67)

This application is a continuation-in-part of United States patent application Ser. No. 353,943 filed Mar. 23, 1964, now U.S. Patent 3,231,977. The invention relates to a process for drilling holes in precise parallelism in human teeth while the teeth are in their natural position in the mouth. More particularly, the present invention relates to a method and apparatus for improving the ease and accuracy with which holes may be drilled in a precise location and in precise parallelism in one or more teeth.

In the cited co-pending application, I disclosed a method and apparatus for drilling parallel holes in teeth, in which method a model is initially made of the teeth, followed by the aligning of a plurality of bushings on the replicas of those teeth in which parallel holes are to be drilled. The alignment of the bushings in parallellism is accomplished in the disclosed method with an apparatus which includes a bushing aligning mandrel which is sighted in on each tooth at the point where the hole is to be drilled and at the angle which will desirably characterize the hole when it is drilled. The bushings, once placed on the model of the teeth to be drilled by the use of the mandrel, can be secured in place by a suitable bonding agent, and then a jig formed around these bushings and the teeth with which they are in contact, using a pliable material which sets up to a hardened state upon standing. The jig is then removed from the model of the teeth, and carries with it the bushings which are retained in precise parallelism by reason of the rigidness of the jig. The rigidness of the jig also assures that it will fit precisely over the natural teeth of the patient from which the model was made, and that it can be snapped or placed in position in the mouth and retained therein by friction fit. When the jig is in place in the patient's mouth, the bushings are necessarily aligned with respect to the natural teeth in precisely the same relative position which they occupied with respect to the model of the teeth. The dentist then uses the several bushings carried by the jig as a guide for the dental drill, and the guiding influence of the several bushings will assure that drilled holes will be in absolute parallelism.

The present invention provides a method and apparatus for simplifying and making less expensive the method of drilling parallel holes in one or more teeth, and in this respect constitutes a substantial improvement over the method and apparatus disclosed in said co-pending application. More specifically, by the technique of the present invention, the number of bushings which are required for practicing the method of the invention can be reduced to a single bushing, and the drilling of the parallel holes in the teeth can be accomplished much more expeditiously than with the procedure described in said co-pending application.

Broadly described, the method of the present invention comprises initially making a model of the patient's natural teeth in which the parallel holes are to be drilled, the model also duplicating a substantial portion of the gum and oral cavity adjacent these teeth; then consecutively aligning a movable tubular drill guide with the teeth on said model corresponding to the natural teeth in which the holes are to be drilled, this consecutive alignment being carried out to align the axis of the tubular drill guide with the desired axes of the holes which are to be drilled while constantly maintaining the axis of the tubular drill guide parallel to a reference line extending through the model. Once the reference line is established by the consecutive "sighting in" of the movable tubular drill guide, the next step of the process entails positioning a guide means having a linear guiding axis adjacent the model with its linear guiding axis coincident with the reference line; then forming a jig complementary in configuration to a portion of the model surrounding the guide means so as to embed in the jig, the guide means thus positioned. Then follows the procedure of fitting the jig in the mouth of the patient in a positon corresponding identically to its previous position on the model and mounting the movable tubular drill guide rotatably and slidably on the guide means embedded in or carried by the jig so that the axis of the tubular drill guide extends parallel to the axis of said guide means in every position of the drill guide relative to the guide means. Finally, the tubular drill guide is moved about so as to consecutively align the axis of the drill guide with the several points on the natural teeth where it is intended to drill parallel holes, and during each consecutive alignment, using the drill guide to guide the dental drill in drilling parallel holes, with the axis of the drill always retained coincident with the axis of the drill guide.

The apparatus used in practicing the paralleling technique of the invention comprises a horizontal stage having a vertically extending standard attached thereto. A horizontal support arm is pivotally connected to said vertically extending standard, and carries a mandrel guide member at its outer end which slidably supports an elongated bushing mandrel. The bushing mandrel is supported in a vertical line by the mandrel guide member, and is used to position a guide means, such as a cylindrical bushing, on or adjacent the model of the teeth in a desired position preliminary to the formation of the jig.

To assist in bringing the model into the proper position and angular relationship to the mandrel, a drill guide assembly is slidably mounted on the bushing mandrel above the bushing and includes a horizontal cantilevered arm rotatably and slidably mounted with respect to the mandrel so that the arm may move up or down on the mandrel, can be swung or swiveled about the axis of the mandrel and can be reciprocated along its axis (normal to the axis of the mandrel). This permits a tubular drill guide sleeve mounted on the outer end of the horizontal cantilevered arm to be consecutively moved to any position necessary to align its axis with a plurality of the teeth in the model, while the axis of the tubular guide sleeve is constantly retained parallel to the axis of the mandrel and to the axis of the tubular bushing.

The apparatus thus far described is used to place the guide bushing in the proper relation to the model of the teeth, and to hold this bushing in place while it is permanently in this relative position by the formation of the jig around it and over at least a portion of the model. When the jig carrying the bushing has been positioned in the mouth of the patient, a short cylindrical post is inserted in the guide bushing and is supported with its axis aligned with the bushing axis. The drill guide assembly is then rotatably and slidably mounted on the cylindrical post in a manner similar to its previous mounting on the mandrel, and the guide sleeve is used to guide the drill of the dentist and maintain it in exact parallelism as the several holes are drilled.

From the foregoing description of the invention, it will have become apparent that a major objective of the invention is to provide an improved method and apparatus for drilling parallel holes in the teeth.

Another object of the invention is to provide a rapid and inexpensive method of drilling a plurality of parallel holes in the teeth of a patient, using a minimum amount of physical structure in the patient's mouth during such drilling.

A further object of the invention is to provide a dental paralleling technique which uses but a single master guide bushing and a jig containing such bushing.

In addition to the foregoing described objects and advantages, additional objects and advantages will become apparent as the following detailed description of the invention is read in conjunction with the drawings.

In the drawings:

FIGURE 1 is a view in elevation depicting a major portion of the apparatus used in the practice of the invention.

FIGURE 2 illustrates the apparatus shown in FIGURE 1 being used to carry out the first step of the process of the invention.

FIGURE 3 is a perspective view illustrating the way the guide bushing is held in place on the model while the jig is formed about the bushing.

FIGURE 3–A is a perspective view illustrating the jig used in carrying out the invention after the jig has been removed from the model of the teeth.

FIGURE 4 is a perspective view of the apparatus used in performing the final steps of the process of the invention. The mouth of the patient is shown schematically in dashed lines.

Referring now to the drawings in detail, and particularly, to FIGURE 1, the apparatus initially used in performing the process of the invention includes a horizontal stage 10 which, in the illustrated embodiment, is a disk-shaped member having flat opposed surfaces and adapted to be rested upon a laboratory table top or the like. Extending upwardly from the horizontal stage, and having its lower end connected to the stage adjacent the periphery thereof is a vertical standard 12. A horizontal support arm 14 carries a sleeve 16 which slidably surrounds the vertically extending standard 12 so that the support arm can be swiveled or pivoted about the longitudinal axis of the standard and can be slid up and down the standard. A set screw 18 is provided for fixing the horizontal support arm in any desired position relative to the standard 12. At its outer end, the horizontal support arm 14 carries a mandrel guide member 20 which has a bore extending vertically therethrough for slidably receiving an elongated bushing mandrel 22. The bushing mandrel 22 is a long generally cylindrical solid member, and may be made to terminate at its upper end in a very fine, small diameter pointed rod 24 which can be used for dental surveying if desired when the apparatus is not in use for the paralleling procedure of the present invention.

The bushing mandrel 22 extends vertically through the bore of the mandrel guide member 20 and its lower end can be rested upon the horizontal stage 10. A cylindrical bushing 26 is slidably mounted on the lower end of the bushing mandrel 22 and can be moved up and down on the mandrel freely. A small O-ring 28 is positioned above the bushing and around the mandrel, and a small piece of rubber dam material 30 of the type used by dentists can be forced over the lower end of the mandrel and will frictionally engage the mandrel so that, as the rubber dam is moved with the bushing, it will prevent the bushing from sliding down from a position at which it is located on the mandrel.

To assist in bringing the model of the teeth into the proper position and angular relationship to the mandrel 22 and to the bushing 26 slidably mounted thereon, a drill guide assembly designated generally by reference character 34 is slidably mounted on the bushing mandrel above the bushing 26. The drill guide assembly includes a support block 36 which has a vertically extending cylindrical bore drilled through one side thereof to slidingly receive the mandrel 22, and which is provided with a rectangular or square cross sectioned bore through the other side thereof extending in a substantially horizontal direction. The square cross sectioned, horizontally extending bore receives a horizontal cantilevered arm 38 which is machined to slide in the receiving bore and is provided with a pair of spaced O-rings 40 which function as stops preventing the cantilevered arm from sliding out of the bore. At its free outer end, the horizontal cantilevered arm 38 carries a tubular drill guide 42 which has a vertically extending bore 44 therethrough, the bore having substantially the same diameter as the shank of the dentist's drill, and having its axis exactly parallel to the longitudinal axis of the mandrel 22 and to the axis of the bore of the bushing 26.

In carrying out the process of the invention, the dentist initially makes a model 46 of the teeth in accordance with conventional dental techniques, such model having a plurality of simulated teeth 48 thereon, a gum portion 50 and an oral cavity portion 52. As described in the previously cited co-pending application, in performing the method of both the present invention and that described in said application, the model 46 is mounted on a deformable material, such as a piece of modeling clay (not visible) which is interposed between the model and a disk-shaped polished metal plate 54. This arrangement permits the model to be canted at any desired angle with respect to the axis of the mandrel 22, the axis of the bushing 26 and the axis of the tubular drill guide 42 by merely pressing on the model to deform the modeling clay in the manner desired. The model can also be moved in a horizontal plane relative to the mandrel 22 and associated apparatus by sliding the polished disk 54 on the stage 10.

The apparatus is initially arranged in the manner illustrated in FIGURE 2 with the bushing 26 and the rubber dam resting flatly on that portion of the model 46 which defines the oral cavity 52. The model is then adjusted and repositioned until it is possible to align the tubular drill guide 42 with each of the model teeth corresponding to those natural teeth in which it is desired to drill the parallel holes. In accomplishing such alignment procedure, it will be apparent that the cantilevered arm 38 can be reciprocated in its substantially square cross sectioned bore, and can also be swiveled about the axis of the mandrel 22, as well as moved up and down on the mandrel, to bring the tubular drill guide 42 to the desired position over the particular teeth in which the holes are to be drilled. The angular relation of the axis of the bore 44 through the tubular drill guide 42 to the teeth is adjusted by depressing the model at some point on the side thereof so as to change the angle of the teeth with respect to the drill guide. In this way, the dentist sights in or aligns the tubular drill guide 42 with the replicas of the teeth in which the holes are to be drilled in a manner suitable to him so that the holes will penetrate the desired portions of the teeth at the point and angle desired.

It will be noted that when the described procedure is followed, a position of the model 46 with respect to the apparatus is established in which the tubular drill guide 42 can be positioned over selected ones of the replica teeth in a manner to drill parallel holes therein at the desired angle without disturbing the position of the bushing 26 in the oral cavity 52 of the model, or, stated differently, the desired positioning of the drill guide for drilling can be then accomplished by moving only the cantilevered arm 38 on the mandrel in one or more of the several ways in which it can be moved without disturbing the mandrel.

When the alignment of the model 46 with respect to the tubular drill guide 42 and the bushing 26 has been accomplished, the next step in the procedure of the invention is to form a jig 58 over a substantial portion of the model and surrounding the bushing so as to enclose the bushing on all sides thereof, and yet leave the bore of the bushing which receives the mandrel 22 unobstructed. This is accomplished by forming a suitable moldable and settable material of the type used by dentists around the bushing 26, and on the upper surface of the model over the oral cavity and over portions of some of the teeth of the model.

The jig material is then permitted to stand for a short while so that it sets up to a hardened state. It can then be removed from the model 46 and will appear as shown in FIGURE 3-A. If desired, a small amount of releasing compound can be applied to the model prior to forming the jig 58 so that it may be more easily removed from the model after it is set up to a hardened state. The jig 58 which is formed in the described manner will be complementary in configuration to the model 46 and therefore can be easily snapped into position in the oral cavity and over portions of the natural teeth 60 in the mouth of the patient.

After the model 46 is placed in position over the natural teeth 60 in the mouth of the patient as shown in FIGURE 4, a short elongated cylindrical post 62 is placed in the bushing 26 with its longitudinal axis coincident with the axis of the bushing. The drill guide assembly 34 is then mounted on the post 62 and in this position has the same freedom of movement thereon as has been previously described in referring to the relationship of the drill guide assembly to the bushing mandrel 22. Thus, the cantilevered arm 38 can be slid in the support block 36 to increase the reach of the tubular drill guide 42. The tubular drill guide 42 is then moved by the dentist into position in alignment with the several teeth in which holes are to be drilled, and the usual dental drill is used to drill the holes in the positions thus selected. Due to the constant parallel alignment of the axis of the bore 44 in the tubular drill guide 42 with the axis of the bore in the bushing 26, the same parallel relationship of the axis of the drill stem is retained during the drilling of all the holes. All the holes are thus in perfect parallelism and enter the teeth at the same angle which was surveyed or decided upon by the dentist during the use of the apparatus with the model 46 as shown in FIGURE 2.

From the foregoing description of the invention, it will have become apparent that the invention provides a rapid and simple method of drilling parallel holes in the natural teeth of a patient with a relatively small amount of physical apparatus disposed in the patient's mouth during such drilling, and with the expense and complexity of the apparatus used in the technique being relatively minor.

Although a specific embodiment of the invention has been shown herein in order to illustrate the manner in which the invention is to be practiced, it is to be understood that variations in the described steps, and modifications in the depicted apparatus, can be effected without departure from the basic principles which underlie the invention. All such modifications and changes which do not depart from the basic principles of the invention are deemed to be circumscribed by the spirit and scope of the invention except as the same may be necessarily limited by the appended claims or reasonable equivalents thereof.

What is claimed is:

1. The method of drilling parallel holes in teeth comprising:

making a model of the patient's natural teeth in which said parallel holes are to be drilled, and of a substantial portion of the gums and oral cavity adjacent said teeth;

consecutively aligning a movable tubular drill guide with the teeth on said model corresponding to the natural teeth in which said holes are to be drilled, said consecutive alignment being carried out to align the axis of said tubular drill guide with the desired axis of the holes to be drilled in the natural teeth while maintaining the axis of said tubular drill guide parallel to a reference line extending through said model;

positioning guide means having a linear guiding axis adjacent said model with its linear guiding axis coincident with said reference line;

forming a jig on the model, which jig is complementary in configuration to a portion of said model surrounding said guide means and which jig contains imbedded therein said guide means;

removing the jig from the model with the guide means imbedded therein;

fitting said jig in the mouth of the patient in a position corresponding identically to its previous position on the model before the jig was removed from the model;

securing a cylindrical post to the guide means with its axis aligned with the linear guiding axis of said guide means; then movably mounting said tubular drill guide on said cylindrical post for vertical and horizontal sliding movement thereon and for rotational movement around the axis thereof;

consecutively aligning the axis of said tubular drill guide with the several points on the natural teeth where it is intended to drill parallel holes; and using said tubular drill guide to guide a dental drill used to drill said parallel holes so that the axis of said drill corresponds to the axis of said tubular drill guide.

2. The method of drilling parallel holes in the teeth of a patient comprising:

making a model of the patient's natural teeth in which said parallel holes are to be drilled, and of a substantial portion of the gum and oral cavity adjacent said teeth;

positioning an elongated support mandrel having a longitudinal axis so that the projection of its longitudinal axis extends through a portion of said model corresponding to the oral cavity of the patient;

mounting a tubular drill guide assembly having a cylindrically bored drill guide on said elongated support mandrel for movement thereon in a vertical direction and also in a direction substantially normal to the longitudinal axis of the mandrel, and finally, in rotational movement about the axis of said mandrel, with all of said movements being independent of each other and obtainable while the axis of the tubular drill guide is constantly maintained in parallelism with the longitudinal axis of said elongated support mandrel;

positioning a guide bushing having a linear guiding axis concentrically around said support mandrel below said tubular drill guide assembly;

consecutively moving the cylindrically bored drill guide into alignment with the teeth on said model corresponding to the natural teeth in which said holes are to be drilled, said consecutive alignment being accomplished by adjusting the model in its position relative to said mandrel and by moving said tubular drill guide assembly on said mandrel, and said consecutive alignment being carried out to align the axis of the cylindrical bore in said drill guide with the desired axes of the holes to be drilled in the natural teeth while maintaining the axis of the cylindrical bore in the drill guide parallel to the longitudinal axis of said mandrel and said guide bushing;

forming a jig on the model complementary in configuration to at least a portion of the model, and surrounding and embedding said guide bushing therein;

removing the jig from the model with the guide bushing embedded therein;

seating said jig in the mouth of the patient in a position corresponding identically to its previous position on the model before the jig was removed from the model;

securing a cylindrical post in the guide bushing with its axis aligned with the linear guiding axis of said guide bushing;

movably mounting said tubular drill guide assembly on said cylindrical post for vertical and horizontal sliding movement thereon, and for rotational movement around the axis of said cylindrical post; then consecutively aligning the axis of the cylindrical bore in said drill guide with the several points on the natural teeth where it is intended to drill parallel holes; and during such consecutive alignment
using said tubular drill guide to guide a dental drill used to drill said parallel holes so that the axis of said dental drill corresponds to the axis of the cylindrical bore in said tubular drill guide.

3. Apparatus for drilling parallel holes in the teeth comprising:
a horizontal stage;
a vertically extending standard attached to said stage;
a horizontal support arm movably supported on said standard for pivotal movement about the longitudinal axis of said standard and for sliding movement in a vertical direction on said standard;
a mandrel guide member on said horizontal support arm;
an elongated mandrel extending vertically through said mandrel guide member and slidable therein;
guide means slidably mounted on said mandrel for vertical movement thereon and having a linear guiding axis;
a drill guide assembly slidably and rotatably mounted on said mandrel above said guide means and including:
a horizontal cantilevered arm rotatably and slidably mounted on the mandrel for vertical, horizontal and rotative movement relative to the axis of the mandrel; and
a tubular guide sleeve mounted on the horizontal cantilevered arm for movement therewith.

4. Apparatus as defined in claim 3 wherein said guide means comprises a bushing having a cylindrical bore therethrough corresponding in diameter to the diameter of said mandrel, said bushing concentrically surrounding said mandrel and slidable vertically thereon; and wherein said apparatus is further characterized to include
an elongated cylindrical post having a diameter substantially equal to the diameter of said bushing and slidably insertable in said bushing and in said drill guide assembly whereby said drill guide assembly can be movably positioned in the mouth of a patient with the axis of said tubular guide sleeve constantly extending substantially parallel to the axis of said cylindrical post and to the cylindrical bore of said bushing.

5. Apparatus as defined in claim 3 and further characterized to include:
a model of the natural teeth of the patient in whose teeth the holes are to be drilled, and of the gums and oral cavity adjacent said teeth, said model being slidably supported on said stage; and
a jig bearing against the upper surface of said model and complementary in configuration thereto, said jig surrounding and fixing the position of said bushing.

6. Dental apparatus for drilling parallel holes in the teeth of a patient comprising:
a horizontal stage;
a vertically extending standard attached to the upper surface of said stage;
a horizontal support arm movably supported on said standard for pivotal movement about the longitudinal axis of said standard and for sliding movement in a vertical direction on said standard;
means for fixing the position of said support arm on said standard;
a tubular mandrel guide member on said horizontal support arm adjacent one end thereof;
an elongated, cylindrical bushing mandrel extending vertically and slidably through said tubular mandrel guide member;
a guide bushing slidably surrounding said mandrel and having a cylindrical bore therethrough corresponding in diameter to the diameter of said mandrel;
a drill guide assembly slidably and rotatably mounted on said mandrel above said bushing and including
a support block having a cylindrical bore therethrough slidably receiving said mandrel and having a horizontal bore extending therethrough;
a horizontal cantilevered arm extending slidably through said horizontal bore in said block; and
a tubular guide sleeve mounted on one end of the horizontal cantilevered arm and having a tubular bore therethrough with an axis extending parallel to the longitudinal axis of said elongated mandrel;
a model of the natural teeth of the patient in whose teeth the parallel holes are to be drilled, and of the gums and oral cavity adjacent the teeth, the oral cavity portion of said model supporting said guide bushing; and
a jig on said model around said bushing and complementary in configuration to said model.

References Cited

UNITED STATES PATENTS

| 2,224,264 | 12/1940 | Jeanneret | 32—67 |
| 3,078,580 | 2/1963 | Galvez | 32—67 |
| 3,150,448 | 9/1964 | Wazar | 32—67 |
| 3,226,828 | 1/1966 | Spaltan | 32—67 |

FOREIGN PATENTS

| 836,993 | 1952 | Germany. |

RICHARD A. GAUDET, *Primary Examiner.*

J. W. HINEY, *Assistant Examiner.*